Patented Apr. 18, 1933

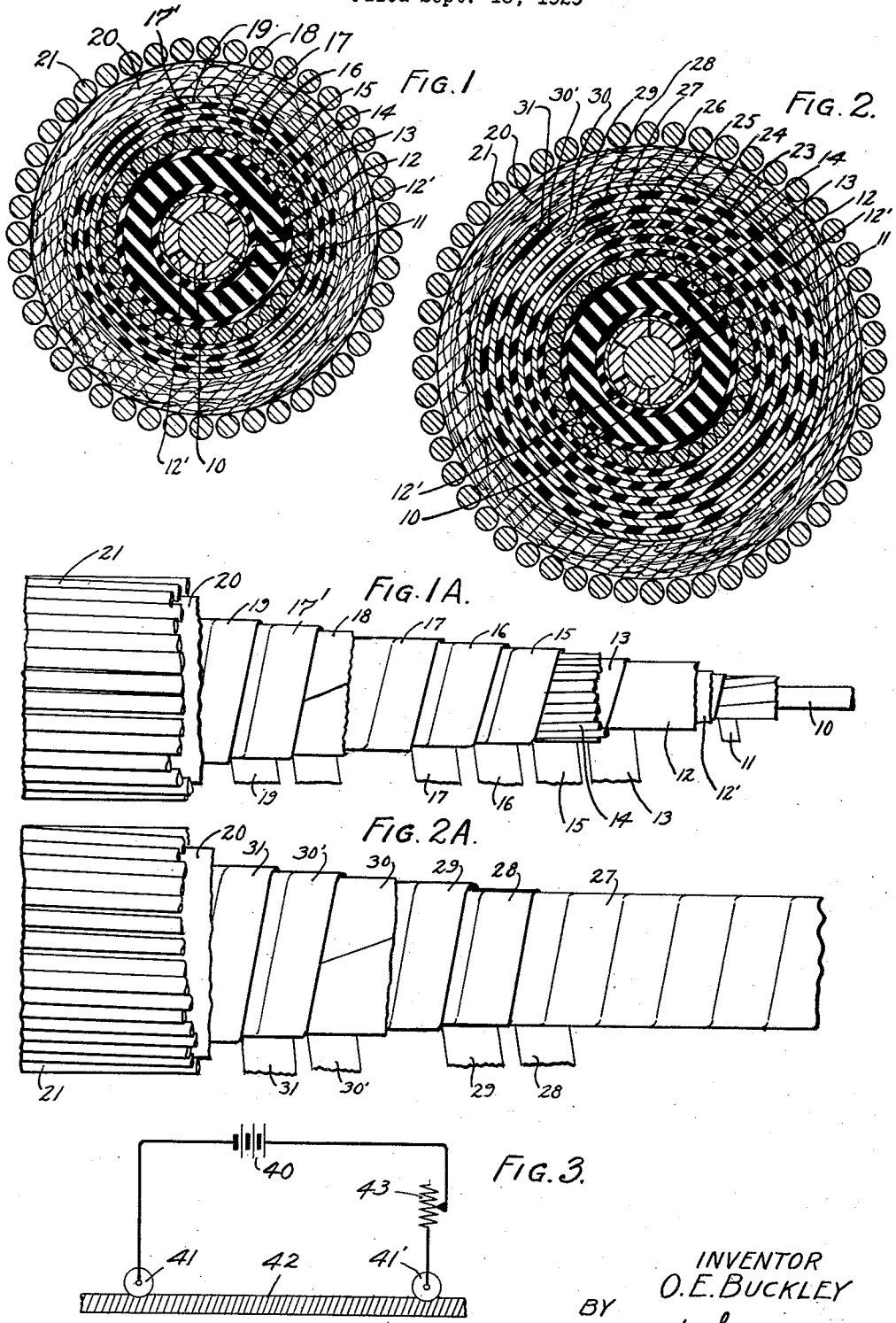

1,903,975

UNITED STATES PATENT OFFICE

OLIVER E. BUCKLEY, OF MAPLEWOOD, NEW JERSEY, ASSIGNOR TO BELL TELEPHONE LABORATORIES, INCORPORATED, OF NEW YORK, N. Y., A CORPORATION OF NEW YORK

SUBMARINE SIGNALING CABLE

Application filed September 13, 1929. Serial No. 392,351.

The present invention relates to signaling cables and more particularly to submarine signaling cables of the concentric return type.

An object of the invention is to prevent extraneous inductive and other disturbances from interfering with the intelligibility of signals transmitted over submarine signaling cables.

Another object of the invention is to effectively shield a submarine signaling cable from external disturbances without impairing the mechanical flexibility of the cable.

A further object of the invention is to reduce the power level at which intelligible signaling waves may be received at the terminals of a submarine signaling cable.

In the transmission of signaling impulses on submarine cables, a lower limit is generally set by extraneous disturbances to the power level which must be received, in order to make the signals intelligible. These disturbances may arise from atmospheric and/or telluric sources in which case they are similar to radio static, or they may arise from adjacent carriers of electric currents, such as adjacent submarine signaling and/or power cables. In the case of atmospheric disturbances, interference is only encountered in those sections of the cable which lie in relatively shallow water or which lie outside of the water, since for those sections of the cable which lie in deep water, the sea water itself serves as an effective shield. Consequently the return current may be allowed to stray from the return conductor in deeply laid parts of the cable not subject to interference; indeed, the return conductor may be omitted from those parts of the cable, insofar as considerations of interference are involved, and the total return current allowed to flow through the sea water and/or armor. In the case of disturbances from other cables, interference is experienced even in deep water, at cable crossings, for instance, where the cables are in actual mechanical contact or lie in close proximity for considerable distances. In general, interference is particularly troublesome in shallow water near the shore where both of the above mentioned sources of disturbance are usually present.

In order to minimize the effect of the extraneous disturbances upon the intelligibility of signals received at the receiving end of a signaling channel, such as a telephone cable of transoceanic length, for instance, it is necessary to raise the receiving level of the signals above the noise level, and this in turn necessitates either the use of a cable of lower attenuation or the use of a higher transmitting level than would be required if the disturbances were absent. The transmitting level is, however, generally limited by the electrical and magnetic characteristics of the cable or by the transmitting apparatus.

If the effect of external sources of disturbance could be reduced, the signals could be received at a lower level and a cable of greater attentuation could be used to meet a given requirement of freedom from noise. There is, however, a limit beyond which further reduction of the effect of external disturbances offers no advantage. This limit is set by resistance noise, that is, noise caused by thermal agitation of electricity in the cable conductor. It is desirable to reduce the noise from external sources to a level low in comparison with this resistance noise.

Long deep sea cables introduce a very high attentuation for currents of essential speech frequencies such as are required for telephony. In the use of such cables it may be necessary to permit an attenuation of the order of 150 decibels for the higher frequencies of the voice range. Such an attenuation may reduce the received signal currents to a level approaching the limiting value imposed by the thermal agitation of electricity in the cable conductor and consequently less than the value of the extraneously induced disturbances which are encountered when the usual expedients are employed to eliminate such extraneously induced disturbances. It therefore becomes imperative in signaling at frequencies of the order occurring in speech or higher frequencies over cables involving such high attenuations to substantially entirely eliminate any disturbance whatever induced by external sources.

Cables may be designed according to the present invention to reduce the effect of external disturbances to a level below that of the resistance noise level of the cable conductors without impairing the flexibility of the cable by providing between the concentric return conductor and the armor wire a wrapping of tapes or wires or a sheath of magnetic material of high initial permeability forming a magnetic path around the conductor, and in cases where the external interference is more severe, by applying outside this shield a sheath of high electric conductivity forming a longitudinal conductor which is in turn surrounded by a magnetic sheath, or, in special cases, by providing a plurality of magnetic sheaths alternating with highly conductive sheaths.

By the use of this invention the balanced sea-earth connection which has been employed heretofore in submarine cables to reduce shore end interference may be eliminated with a consequent substantial gain in the transmission equivalent of the cable.

While a preferred embodiment of the invention will be described as applied to a long deep sea concentric return telephone cable, it is understood that the invention is also applicable to other types of cables, such as twin core and multi-core cables, as well as to single core cables without a balanced sea-earth connection.

For a more detailed description of the various features and objects of the invention reference will now be made to the attached drawing in which Fig. 1 shows a cross section through a submarine signaling cable representing one embodiment of the invention and Fig. 1—A is a view showing different stages of construction of the embodiment of Fig. 1.

Fig. 2 shows a cross section through a submarine signaling cable representing another embodiment of the invention.

Fig. 2—A is a view showing different stages of construction of the embodiment of Fig. 2, and Fig. 3 illustrates schematically one method of treating the magnetic shield in accordance with this invention.

In Figs. 1 and 1—A the central copper conductor 10 may be loaded or non-loaded. It is shown loaded with helically applied loading material 11 and is surrounded by a layer of insulating material 12 such as gutta-percha. The copper conductor and loading material are surrounded by a pressure equalizing fluid shown at 12'. A fabric tape or pad 13 surrounds the gutta-percha core for protection against damage from the concentric return conductors 14. The return conductors 14 are surrounded by a layer of fabric 15 which separates them from a sheath of magnetic material 16 in a manner to avoid electrolytic action between the copper conductors and the magnetic material. Among the materials particularly suitable for the magnetic shield 16 are alloys of special composition and heat treatment such as described in G. W. Elmen Patents 1,586,883 and 1,586,884, both patented June 1, 1926 and 1,715,541 of June 4, 1929 and in P. P. Cioffi's patent application Serial No. 325,883 filed December 13, 1929. When this type of material, particularly such a material as that composed of 55% nickel, 34% iron and 11% chromium and other similar materials described in U. S. Patent No. 1,586,883 is used, initial permeabilities of the order of 1000, corresponding to about 700 on the conductor, are obtainable. The shielding or loading layer of magnetic material has little conductivity in the direction of the cable axis due to its spiral form and the relatively high resistivity (about 100 for the above mentioned material) of the usually available magnetic materials compared to that of copper. Under average interference conditions a single sheath of magnetic material applied with a short lay and providing a nearly circular path of high permeability may, in conjunction with the armor wires, sufficiently shield the cable so that the external noise level is below the resistance noise level. If, however, more troublesome interference is to be encountered, the sheath 16 may be surrounded by a layer of fabric 17 upon which is applied additional shielding means to increase the effectiveness of the sheath 16, such as conductive copper tapes 18 which have high electrical conductivity; these tapes are applied with a rather long lay and in turn, are surrounded by a magnetic sheath 19 of short lay from which they are separated by a fabric tape 17'. Although the conductors 18 are shown in the form of tapes, they may take the form of either wire or tape. The sheath formed by tapes 18 is surrounded by the usual jute 20 which forms the bedding for the usual armor wires 21.

Figs. 2 and 2—A show an embodiment of the invention in which instead of a single layer of magnetic material and a single layer of conductive material, there are provided successive layers of magnetic material 24 having a short lay, fabric tape 25 to separate the magnetic material from the copper tape, copper tape 26 with long lay, fabric tape 27, magnetic tape 28, fabric tape 29, copper tape 30, fabric tape 30', magnetic tape 31. With a structure of this type any desired degree of shielding may be easily obtained without materially diminishing the flexibility of the cable.

A concentric return submarine cable has the following current paths: a central or outgoing conductor (I); a return conductor (II) which is constituted by: (1) the return conductor proper, (2) the armor wires, and (3) the sea water which, owing to skin effect, carries a considerable part of the return current. An external disturbance will induce an electromotive force in each one of these conductors. If the electromotive force induced in the outgoing conductor (I) were equal to the electromotive forces induced in the return conductor (II), their effects upon the receiving apparatus would be nil. The electromotive forces induced in the return conductor would be equal to those induced in the outgoing conductor if the return conductor were constituted by only one physical conductor and placed as close to the central conductor as possible mechanically and electrically, or in other words, if the sea water could be prevented from carrying a substantial amount of return current. The present invention achieves this result by providing a layer or layers of conductive and/or magnetic materials between the return conductor proper (1) and the armor wire (2) in close proximity of the insulated central conductor. By this means the effective inductance of that part of the return current which flows through the sea water is increased and the return current is caused to flow chiefly through the metallic highly conductive concentric return path which is located as close to the central conductor as dielectric considerations permit. This result follows from the principle that the current flowing in a divided circuit tends to divide so that the effective inductance of the circuit will be a minimum, other things being equal. Since the magnetic flux in the magnetic layer outside the return conductor is equal to the differences of the flux set up therein by the current in the central conductor and in the return conductor, this flux and therefore the inductance of the circuit will be a minimum when the current in the return conductor is equal to that in the central conductor. The smaller the magnetic reluctance of the magnetic layer the more nearly does the return current tend to flow according to this ideal condition and the more is the cable circuit shielded from external sources of E. M. F. This is equivalent to increasing the inductance of the circuit which includes the return path through the sea water.

As has been stated above, the magnetic material should have a high initial magnetic permeability as applied to the cable. The requirement introduces a difficulty owing to the characteristic of practically all of the magnetic materials suitable for the purposes of this invention, namely that their permeability is seriously decreased after they become subject to mechanical work, such as winding them upon a core. It is known, however, that the originally high permeability may be restored to these materials if they are heat treated after the mechanical working which has caused the decrease in permeability. In order, therefore, to satisfy the requirement of high permeability on the cable, one feature of the present invention which is purely ancillary and may or may not be used to accomplish the principal purposes of the invention consists in heat treating the magnetic material in situ on the cable core. In accordance with this feature an electric current is used to heat the magnetic material during or after its application to the core to a temperature between about 600° C. and 900° C. for a few minutes. This treatment suffices to restore the originally high permeability to the magnetic material. Fig. 3 shows one method of applying such a treatment. In this figure, an electric current from source 40 is impressed by conductive rolling contacts 41 and 41' upon the convolutions of magnetic material 42 wound upon an insulated cable core which is propelled in the direction shown by any suitable means (not shown). The amount of power $I^2R$ to be dissipated in the convolutions comprised at any time between the contacts 41 and 41' to heat the material to the desired temperature may be accurately controlled by the adjustable resistance 43.

The term "tape" in the appended claims is intended to cover all equivalents of tape, such as strips or wire, for instance, and the expression "magnetic permeability of iron" is intended to refer to the values of permeability (at the magnetizing forces encountered under the conditions of operation) which were commonly accepted about September 13, 1929. It is also understood that instead of a wrapping a continuous sheath could be used to accomplish the essential objects of the invention.

What is claimed is:

1. A signaling cable comprising an insulated central conductor, a concentric return conductor surrounding said central conductor, means surrounding said return conductor for causing the return current to flow chiefly through the concentric return conductor, said means comprising an envelope of magnetic material having a low magnetic reluctance in a closed path circumferential to said cable.

2. A cable according to claim 1 in which the envelope of magnetic material is a flexible layer embodied in and constituting a portion of said cable.

3. A subaqueous signaling cable comprising a central conductor, a return conductor and armor, said cable being so constructed that when laid in a conducting medium a return path of materially conducting properties through the conducting medium exists, and magnetic material in addition to elements previously enumerated incorporated in said cable external to the return conductor whereby the inductance of the return path through the conducting medium is increased disproportionately to the inductance of the return path through said return conductor.

4. A deep sea signaling cable comprising an insulated outgoing conductor, a return conductor not completely insulated from the surrounding medium, and means external to said conductors for shielding them from external disturbances, said means comprising a metallic sheath having a magnetic reluctance in a circular direction not over a small fraction of the reluctance of air.

5. A submarine communication cable having a principal conductor surrounded by a layer of insulation and a return conductor outside said insulation, characterized in this, that for the purpose of reducing the effect of external disturbances upon the circuit comprising said conductors said cable includes a plurality of alternate circularly magnetically permeable and longitudinally electrically conductive layers outside said return conductor, the inner of said layers being magnetic.

6. In a submarine signaling cable having an outgoing conductor and an uninsulated return conductor, means for reducing the effect of extraneous disturbances without materially impairing the flexibility of the cable, said means surrounding the return conductor and comprising a wrapping of tapes of material having high electrical conductivity and a wrapping of tapes of material having high magnetic permeability.

7. Cable as defined in claim 6 further characterized in this that the tapes having the high magnetic permeability are applied with a short lay.

8. Cable as defined in claim 6 further characterized in this that the tapes having the high electrical conductivity are applied with a long lay.

9. Cable as defined in claim 6 further characterized in this that the successive layers of tape are separated by fabric.

10. Cable as defined in claim 6 in which the initial permeability of the magnetic material is higher than that of iron.

11. In a submarine signaling cable having a return conductor grounded in at least some portion of the cable, means surrounding the return conductor in at least certain portions of the cable for increasing the signal to external noise ratio, said means comprising a substantially circular path of high magnetic permeability external to said return conductor.

12. In a submarine signaling cable comprising an insulated outgoing conductor and an uninsulated return conductor, means for reducing the effect of extraneous disturbances upon said conductors which comprises upon the insulated core in spaced relationship a material constituting a substantially closed circular path and material constituting a substantially continuous longitudinal path, the magnetic permeability of the first mentioned path being of the order of that of ferro-magnetic materials and the electrical conductivity of the last mentioned path being of the order of that of copper.

13. A submarine signaling cable, a section of which has a central insulated conductor and a return conductor not insulated from the surrounding medium, means for causing the return current to flow in said return conductor to such an extent that intelligible signaling waves may be received at a level close to the level of the noise producing disturbances caused by the thermal agitation of electricity in said conductors, said means comprising at least one metallic sheath around those sections of the cable which are chiefly exposed to the influence of external disturbances, said sheath having a magnetic reluctance in a path encircling said cable of the order of the reluctance of ferro-magnetic materials.

14. A deep sea telephone cable comprising a central conductor and an uninsulated return conductor and having an overall attenuation of the order of 150 decibels at certain essential transmission frequencies and means for reducing the effects upon receiving apparatus attached to said conductors of parasitic potential differences arising within the medium external to said cable to such an extent that the resulting disturbance will be of an order not materially greater than that of the disturbance caused by the thermal agitation of electricity in the circuit conductor, said means comprising inductive loading for a return circuit path including the external medium and not effective to increase the inductance of a path through said conductors.

15. A communication cable which has in one signaling channel an outgoing conductor and a plurality of return paths for current flowing therethrough, said cable including loading material (11) to increase the inductance of circuits completed through both of said paths and other loading material (16) to increase the inductance of a circuit completed through one only of said paths.

16. The step in the manufacture of a submarine signaling cable having a tape of magnetic material wound upon a core insulated with non-heat resisting material, which comprises causing an electric current of such intensity to flow through said tape for a short time that the latter is heated in situ upon the core to a temperature sufficient to increase the permeability of the tape.

17. A signaling cable comprising a central conductor, an insulating layer surrounding said conductor, armor surrounding said insulating layer, said armor being more or less exposed to the influence of stray electromotive forces in the medium in which the cable may be laid, a return conductor of longitudinal conductivity approximately as good as the conductivity of the central conductor lying between said armor and said insulating layer, and means to cause the return current to confine itself to said return conductor rather than to flow in the armor, said means comprising a layer of ferro-magnetic material between said armor and return conductor, said layer having low magnetic reluctance in a circular path about said cable.

In witness whereof, I hereunto subscribe my name this 12th day of September, 1929.

OLIVER E. BUCKLEY.